US012151463B2

(12) United States Patent
Averdiek et al.

(10) Patent No.: US 12,151,463 B2
(45) Date of Patent: Nov. 26, 2024

(54) METHOD FOR AUTOMATED ERROR MANAGEMENT IN A PRINTING MACHINE

(71) Applicant: Windmöller & Hölscher KG, Lengerich (DE)

(72) Inventors: Guido Averdiek, Lengerich (DE); Martin Krümpelmann, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 17/769,082

(22) PCT Filed: Oct. 14, 2020

(86) PCT No.: PCT/EP2020/078831
§ 371 (c)(1),
(2) Date: Apr. 14, 2022

(87) PCT Pub. No.: WO2021/074183
PCT Pub. Date: Apr. 22, 2021

(65) Prior Publication Data

US 2024/0100819 A1 Mar. 28, 2024

(30) Foreign Application Priority Data

Oct. 17, 2019 (DE) ......................... 102019128139.3

(51) Int. Cl.
*B41F 33/00* (2006.01)

(52) U.S. Cl.
CPC ................................ *B41F 33/0036* (2013.01)

(58) Field of Classification Search
CPC .................................................. B41F 33/0036
See application file for complete search history.

(56) References Cited

U.S. PATENT DOCUMENTS 8,817,091 B2 8/2014 Koltermann
2009/0188405 A1* 7/2009 Stiel .................... B41F 33/0036
101/484

FOREIGN PATENT DOCUMENTS

DE 202010008084 U1 * 12/2011 .......... B41F 33/0009
DE 102011050733 A1 12/2012
(Continued)

OTHER PUBLICATIONS

International Searching Authority—International Search Report, pertaining to International Application No. PCT/EP2020/078831, dated Dec. 23, 2020, together with the Written Opinion of the International Searching Authority and translation pages of ISR, 11 pages.

*Primary Examiner* — Christopher E Mahoney
*Assistant Examiner* — Marissa Ferguson-Samreth
(74) *Attorney, Agent, or Firm* — Sunstein LLP

(57) ABSTRACT

The invention relates to a method for automated error management in a printing machine, in which a recurring print image is imprinted on a moving material web.
To improve automated error management for existing inspection systems, a method is provided in which an inspection of the moving material web is controlled by a control unit and a function switch, the function switch being switchable at least between a first function mode and a second function mode, and in which the print image is acquired by a first inspection unit in the first function mode and forwarded to the control unit, and in which the print image is acquired by a second inspection unit in the second function mode and forwarded to the control unit.

7 Claims, 3 Drawing Sheets

(56) References Cited

FOREIGN PATENT DOCUMENTS

Figure 1:
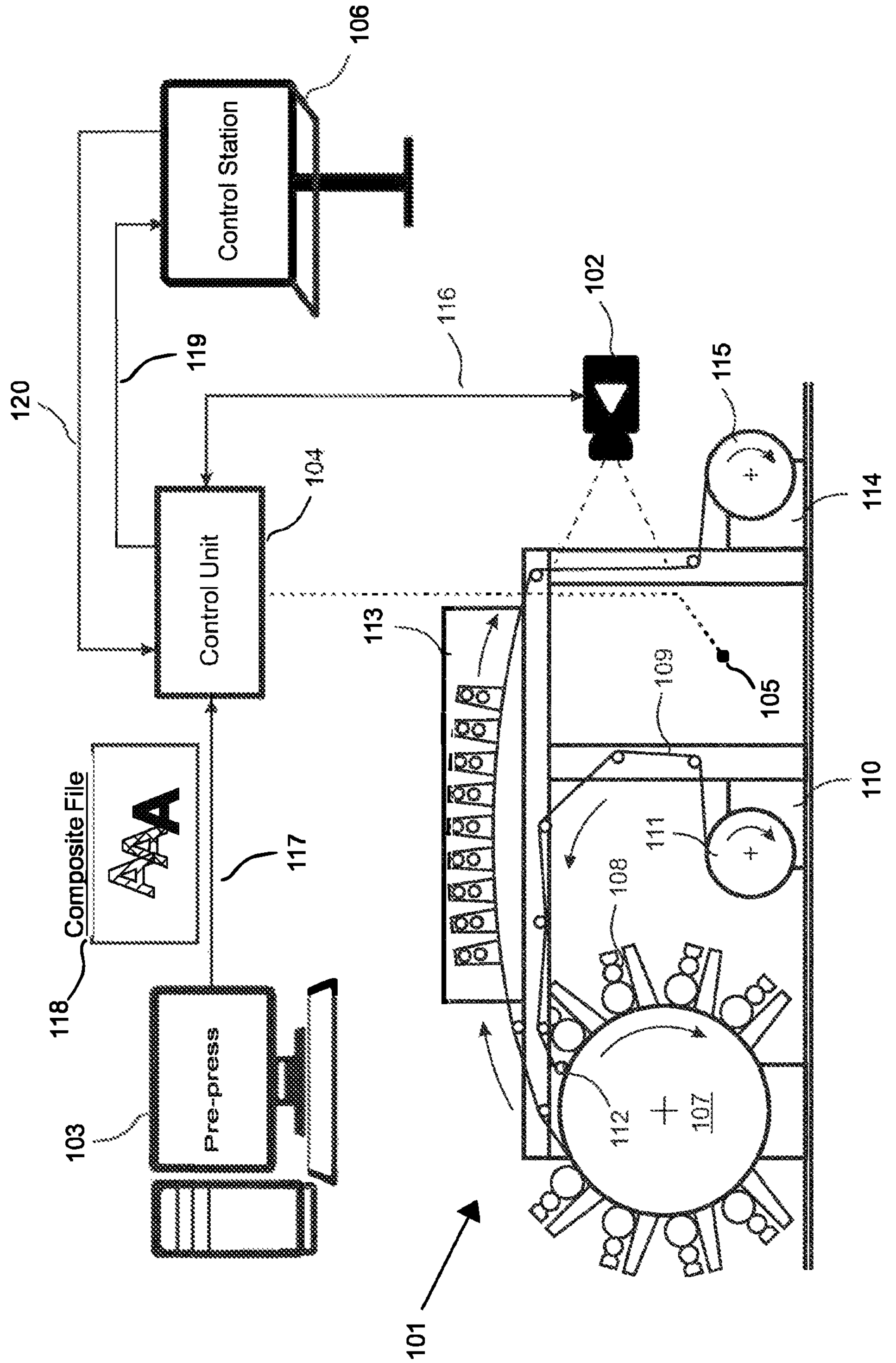

| | | | | | |
|---|---|---|---|---|---|
| EP | 1619026 | A2 * | 1/2006 | .......... | B41F 33/0036 |
| WO | WO-2006067118 | A1 * | 6/2006 | ......... | H04N 1/00236 |
| WO | WO-2009047263 | A1 * | 4/2009 | ......... | G01N 21/8903 |

* cited by examiner

METHOD FOR AUTOMATED ERROR MANAGEMENT IN A PRINTING MACHINE

CROSS-REFERENCE TO RELATED APPLICATIONS

This application is the national stage entry under 35 U.S.C. § 371 of International Patent Application No. PCT/EP2020/078831 filed on Oct. 14, 2020, and claims the benefit of German Patent Application No. 10 2019 128 139.3 filed Oct. 17, 2019, the disclosures of which are incorporated herein by reference in their entirety.

The invention relates to a method for automated error management in a printing machine, in which a recurring print image is imprinted on a moving material web.

In this context, error management refers to all actions taken to handle printing errors in the printing machine during the printing process. Error management typically includes three phases, namely error detection (i.e. the determination that an error is present), error diagnosis (i.e. allocation to a specific cause), and the actual error elimination.

So-called inspection systems are used to carry out error management in a printing machine. Such inspection systems are generally designed to enable the operator to observe and control the print image as a stationary image on a monitor in the ongoing printing process. The print image is typically acquired by a line scan camera. In contrast to an area scan camera, the line scan camera only acquires a single image line at a time since this allows for achieving a higher resolution and a higher readout speed compared to an area scan camera. The two-dimensional image is then created based on the movement of the conveyor. However, since this movement is subject to continuous fluctuations, the feed is synchronized via an encoder to prevent image distortions.

As an alternative or in addition to the line scan camera, the inspection system may also feature an area scan camera (also called matrix camera) that acquires a section of the print image on the moving material web. Synchronizing the area scan camera with the recurring print image ensures that a stationary image representing the selected section of the print image is displayed to the operator on the monitor of the control station. Preferably, the selected section is a distinctive area of the print image in which printing errors have a particularly relevant effect. The matrix camera is typically capable of zooming so that faulty or problematic areas of the print image may be examined in high resolution. If the operator detects printing errors in the displayed section (for example, color or register errors), the operator is in a position to readjust the machine parameters (for example the impression setting, the longitudinal register, or the lateral register) to correct the printing errors.

Alternatively or in addition to the line scan camera and the area scan camera, the inspection system may further feature an optical spectrometer. An optical spectrometer breaks the light absorbed by a light point into its spectral components and evaluates the result in a computer system. Miniature spectrometers that are installed in a compact housing and may thus be placed in a suitable location within the printing machine are particularly suitable for the applications of the present invention. Such miniature spectrometers generally consist of an aperture (i.e. an entry gap), an optical grating, and an optical sensor. The grating is located behind the aperture and scatters the spectral components of the incident light at slightly varying angles, thus enabling the optical sensor to evaluate the scattered light as light intensity over the wavelength of the respective light components. Such an optical spectrometer is thus capable of monitoring the color components of a pixel within the print image during the printing process and of identifying deviations from a desired color result.

The positions of the errors detected by the operator on the moving material web are saved in the inspection system. After the completion of the printing process, it is then possible, for example with the aid of a rewinder, to move to and separate the faulty portion of the imprinted material web. It is equally feasible to mark the faulty areas on the material web during printing and to discard them during subsequent processing.

Furthermore, error recognition algorithms are known that are able to automatically recognize certain errors in the print image and to subsequently support the operator in fulfilling his tasks.

For example, an error recognition algorithm may be based on a reference image acquired at the start of the print order. The reference image may, for example, be acquired via the line scan camera, the area scan camera, and/or the optical spectrometer at the start of the printing process based on the first print images (for example, the first 50 images), using a process in which these first images are integrated to create the reference image (also called “Golden Image”). In the integration phase, the fluctuation range of the image information may, for example, be determined for each individual pixel to set tolerance limits for error recognition. The currently acquired image is then subtracted from the reference image during the printing process. If the resulting difference is outside of the error tolerances, an error signal is generated, and the faulty image range is displayed on the monitor of the control station.

Alternatively or additionally, the desired print result may also be specified by means of the so-called digital proof provided by the prepress phase. To determine whether the print result meets the specifications, the image supplied by the inspection system is compared to the digital proof. The digital image processing techniques described above for the reference image may also be used for this comparison.

However, the above-described inspection systems and error recognition algorithms do not yet, or only to a minor extent, enable automatic error management in printing machines. Automatic error management in this context means that the printing machine operator is supported in all three phases of error management. Ideally, the automatic error management will even take over all actions that are required regarding a specific error in the printing machine.

The task of the invention is therefore to improve the automatic error management for existing inspection systems.

This task is solved by the characteristics of claim 1. Further preferred specific embodiments are given in the subclaims.

The attached drawings describe further details and advantages of the invention.

Figure 2:
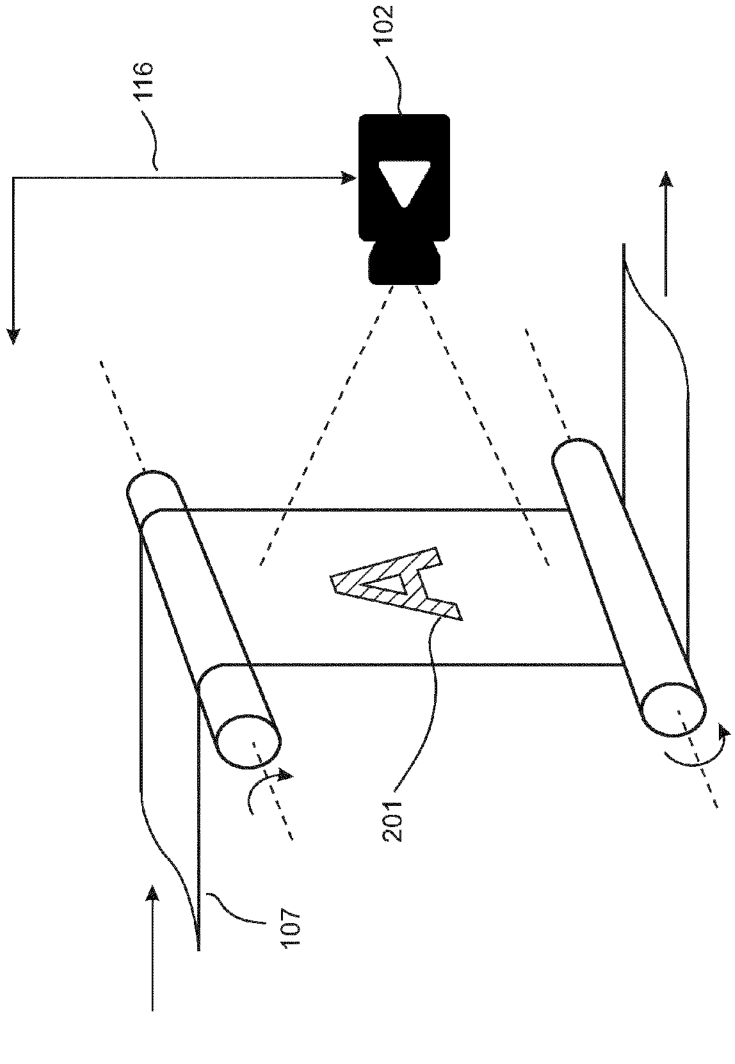
Figure 3:
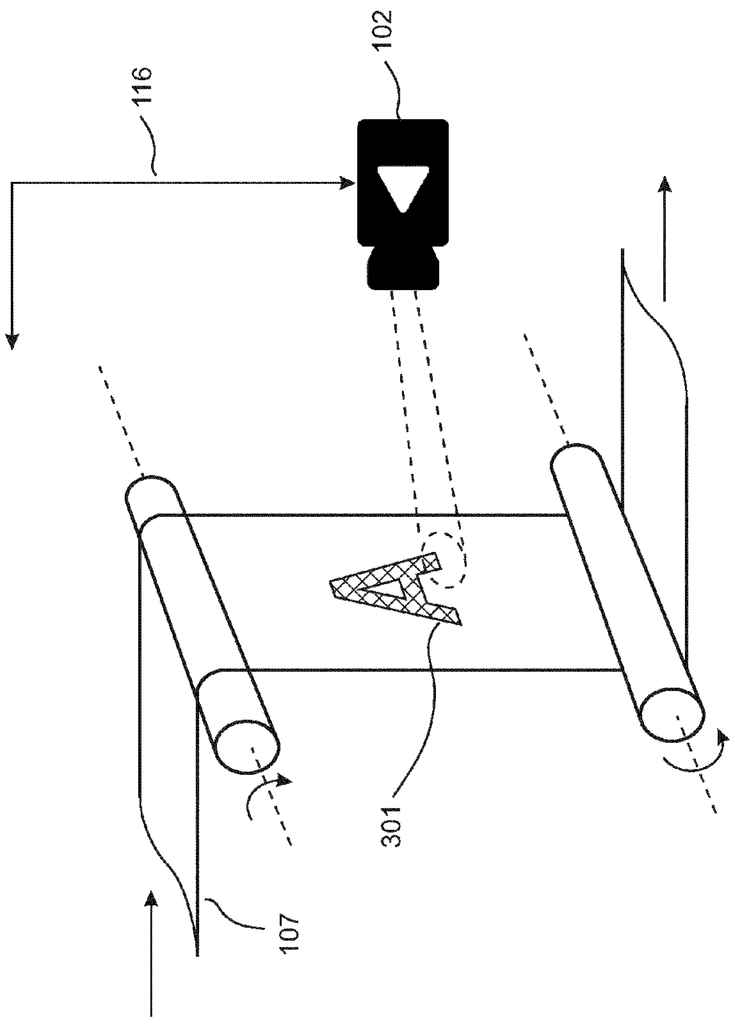

FIG. 1 shows an overall view of the printing machine according to the invention, using the example of a flexographic printing machine, FIG. 2 shows a detail view of FIG. 1 including a line scan camera and a moving material web, and FIG. 3 shows a detail view of FIG. 1. including an area scan camera capable of zooming and a moving material web.

FIG. 1 shows an overall view of the printing machine according to the invention, using the example of a flexographic printing machine 101 having a camera 102, a prepress phase 103, a control unit 104, and a control station 106. The control unit is installed at position 105 of the flexographic printing machine 101 and is shown separately for reasons of clarity.

The flexographic printing machine 101 is a so-called color impression machine and thus has a color impression drum 107 around which the eight color decks are installed in a satellite arrangement. Each of these color decks has a plate cylinder, an anilox mandrel and a doctor blade chamber, each mounted on machine-side anchorages. Color deck 108 is labeled with the described components as an example of these eight color decks.

To imprint the material web 109, it is pulled off the material roll 111 in the unwinding station 110 and guided over several deflection rollers to the nip roller 112. The nip roller 112 places the material web 109 on the color impression drum 107 for further transport so that the material web 109 is moved with register accuracy past the color decks and the between-color dryers not shown in detail.

Once the material web 109 has left the color impression drum 107, it is moved through a bridge dryer 113 for drying the ink and is then wound onto the material roll 115 in the rewinding station 114.

Camera 102 is designed to be operable both as a line scan camera and as an area scan camera capable of zooming by the control unit. Camera 102 is connected to the control unit 104 via cable 116 for operation. Alternatively, it is understood that two separate cameras may be provided in the form of a line scan camera and an area scan camera, it being feasible to operate both cameras either jointly or individually as desired.

The monitor of the control station 106 is designed as a touchscreen, enabling the operator to execute certain commands for operating the flexographic printing machine 101 directly on the monitor through menu navigation. Among other features, the menu navigation of the control station provides a function switch on the touchscreen, the function switch being switchable between at least a first function mode and a second function mode.

In the first function mode, the print image is acquired by a first inspection unit and forwarded to the control unit. Among other features, the first inspection unit comprises the camera 102, camera 102 being operated as a line scan camera in the first function mode. The first inspection unit also comprises an inspection system for continuous web inspection. Another common term for continuous web inspection is "100% inspection" as the recurring print images on the moving material web are acquired 100%. The first inspection unit finally also comprises an inspection system for error recognition with a first error recognition algorithm. For this purpose, an initial print image 118 (composite file) is saved together with the color separations from the prepress phase 103 in the control unit 104, the prepress phase being connected to the control unit 104 via cable 117. In control unit 104, the initial print image 118 is then compared to the actual print image acquired by camera 102.

FIG. 2 shows a detail view of FIG. 1 with a line scan camera and a moving material web. Since the corresponding reference signs were transferred from FIG. 1, reference should be made to the description of FIG. 1. The representation of FIG. 2 corresponds to the first function mode so that camera 102 is operated as a line scan camera that continuously acquires the print image 201.

However, there may occasionally be areas in the print image that cannot be optimally inspected in the first function mode with the settings of the first inspection unit. These include, for example, areas in the image that contain specific spot colors, coatings, patterns, and the like. In order to optionally inspect these areas in the print image under different settings, the operator may use the function switch on the monitor of control station 106 to interrupt the first function mode and to briefly switch to the second function mode.

When the function switch is actuated, the control unit automatically executes all commands to switch to the second function mode.

FIG. 3 shows a detail view of FIG. 1 including an area scan camera capable of zooming and a moving material web. Since the corresponding reference signs were transferred from FIG. 1, reference should be made to the description of FIG. 1. The representation of FIG. 3 corresponds to the second function mode so that camera 102 is operated as an area scan camera capable of zooming.

In the second function mode, the print image is acquired by a second inspection unit and forwarded to the control unit. In addition to the area scan camera, the second inspection unit also comprises special settings that allow for optimal inspection of the aforementioned areas in the print image 301. This may include other illumination situations (e.g. light field instead of dark field) or the use of special software filters. The control unit saves the acquired images and keeps them available for subsequent offline inspection by the operator. Alternatively or additionally, the inspection may also be performed using a second error recognition algorithm.

Once a sufficient number of images has been acquired by the area scan camera, the control unit automatically switches back to the first function mode for continuous web inspection. Alternatively, it is understood that the operator may initiate the switch back to the first function mode.

| List of reference signs | |
|---|---|
| 101 | Flexographic printing machine |
| 102 | Camera |
| 103 | Pre-press phase |
| 104 | Control unit |
| 105 | Position of the flexographic printing machine 101 |
| 106 | Control station |
| 107 | Color impression drum |
| 108 | Color deck |
| 109 | Material web |
| 110 | Unwinding station |
| 111 | Material roll |
| 112 | Nip roller |
| 113 | Bridge dryer |
| 114 | Rewinding station |
| 115 | Material roll |
| 116 | Cable |
| 117 | Cable |
| 118 | Initial print image |
| 201 | Print image |
| 301 | Print image |

The invention claimed is:

1. A method for use in automated error management in a printing machine, the method comprising:

imprinting a recurring print image on a moving material web, controlling an inspection of the moving material web with a control unit and a function switch, the function switch being switchable between at least a first function mode of the printing machine and a second function mode of the printing machine, operating a camera as a line scan camera in the first function mode, and operating the same camera as an area scan camera in the second function mode;

acquiring, by the camera in the first function mode, the print image continuously, and forwarding the print image to the control unit for continuous inspection, and acquiring, by the camera in the second function mode, the print image and forwarding the print image to the control unit for inspection of a specific area of the print image.

2. The method of claim 1, wherein the first inspection unit comprises a first error recognition algorithm.

3. The method of claim 1, wherein the second inspection unit comprises a second error recognition algorithm.

4. The method of claim 1, further comprising activating the function switch while the control unit is in the first function mode to cause the control unit to switch to the second function mode.

5. The method of claim 4, wherein the control unit automatically switches back to the first function mode after a sufficient number of images have been acquired in the second function mode.

6. The method of claim 1, further comprising applying an illumination mode to the print image acquired by the camera in the second function mode.

7. The method of claim 1, further comprising applying a software filter to the print image acquired by the camera in the second function mode.

* * * * *